United States Patent [19]

Aihara

[11] Patent Number: 5,134,187

[45] Date of Patent: Jul. 28, 1992

[54] CATIONIC AQUEOUS PIGMENT DISPERSION

[75] Inventor: Tetsuo Aihara, Isehara, Japan

[73] Assignee: Kansai Paint Co., Ltd., Hyogo, Japan

[21] Appl. No.: 211,923

[22] Filed: Jun. 27, 1988

[30] Foreign Application Priority Data

Jun. 26, 1987 [JP] Japan ................... 62-158951

[51] Int. Cl.$^5$ .............................................. C08L 37/00
[52] U.S. Cl. ...................................... 524/548; 524/555
[58] Field of Search ........................ 524/548, 549, 555

[56] References Cited

U.S. PATENT DOCUMENTS

| | | | |
|---|---|---|---|
| 4,417,013 | 11/1983 | Schuster | 524/548 X |
| 4,546,140 | 10/1985 | Shih | 524/548 X |
| 4,735,991 | 4/1988 | Guioth et al. | 524/548 X |
| 4,906,684 | 3/1990 | Say | 524/548 |

Primary Examiner—Joseph L. Schofer
Assistant Examiner—J. M. Reddick
Attorney, Agent, or Firm—Wenderoth, Lind & Ponack

[57] ABSTRACT

A cationic aqueous pigment dispersion comprising a pigment, a dispersing agent and an aqueous medium, in which the dispersing agent is a water-solubilized or water-dispersed product of a copolymer obtained by copolymerization of (A) 3 to 90 parts by weight of a modified vinylic unsaturated monomer having a fatty acid residue with at least 8 carbon atoms at the molecular terminal, (B) 2 to 90 parts by weight of a nitrogen-containing macromonomer having at least one radical-polymerizable functional group selected from acryloyloxy, methacryloyloxy, allyloxy and an aromatic vinyl group at one end, (C) 1 to 50 parts by weight of at least one vinylic monomer selected from aminoalkyl (meth)acrylates, aminoalkyl-(meth)acrylamides and glycidyl group-containing vinylic unsaturated monomers, (D) 0 to 91 parts by weight of an unsaturated monomer having a nitrogen-containing heterocyclic ring, and (E) 0 to 91 parts by weight of an alpha,beta-ethylenically unsaturated monomer other than (A), (B), (C) and (D) above.

18 Claims, No Drawings

CATIONIC AQUEOUS PIGMENT DISPERSION

This invention relates to a cationic water-base pigment dispersion containing a novel dispersing agent. The pigment is easily dispersible with this dispersing agent and the dispersion has excellent stability.

It has been well known that with emulsion paints and water-base paints (e.g., water-soluble resin paints) containing pigments, undesirable phenomena such as the reduced coloring effect, flooding, floating and reduced gloss of the coated film surface occur owing to the difficulty of dispersion of pigments during production and to the flocculation and sedimentation of the pigments during storage. To avoid these undesirable phenomena, it has been the general practice to prepare an aqueous pigment dispersion by dispersing a pigment with a dispersing agent and mix the dispersion with a water-base paint, thereby giving a pigment-containing water-base paint.

Conventional aqueous pigment dispersions mainly contain low-molecular-weight compounds such as surface-active agents as a dispersing agent. Use of the dispersing agent inevitably results in a deterioration in the properties or state of the resulting coated film. In recent years, attempts have been made to inhibit the deterioration of film properties by using oligomers or polymers having a medium molecular weight as the dispersing agent.

The use of such oligomers or polymers as dispersants, however, brings about disadvantages. For example, the amount of the oligomers or polymers is larger than that of the low-molecular-weight surfactants. Moreover, the use of the resulting aqueous pigment dispersion is limited by the type of the binder used in the water-base paint. This runs counter to the rationalization of paint production, and it has been strongly desired to develop an aqueous pigment dispersion that can be commonly applied to various types of water-base paints.

The present inventor proposed copolymer compositions described, for example, in Japanese Laid-Open Patent Publications Nos. 161464/1985 and 217271/1985 as dispersants for cationic aqueous pigment dispersions. These dispersants in small amounts permit easy dispersing of pigments These copolymer compositions are of the so-called comb-like structure in which a hydrophobic portion and a hydrophilic portion are well balanced. They contain a nitrogen component having excellent adsorptive power for pigments and have very high surface activity in aqueous solution. These polymer compositions show excellent pigment dispersing ability in lesser amounts than do conventional water-soluble resins. Aqueous pigment dispersions prepared by using the copolymer compositions as dispersants have excellent pigment dispersibility during production, but on long-term storage, the pigment particles flocculate to form solid cakes either partially of wholly. Even when the caked pigment particles are re-dispersed by using an agitator, it is impossible to restore them to the dispersed state before storage. Such pigment dispersions will cause various troubles such as formation of nibs in the coated film or the reduced gloss of the coated film.

The present inventor, after strenuous efforts, found that the above problem can be solved by using a copolymer derived from, as essential monomer components, (1) a monomer having a fatty acid group, (2) a macromonomer obtained by polymerization of a nitrogen-containing unsaturated monomer, and (3) an aminoalkyl (meth)acrylate and/or an aminoalkyl(meth)acrylamide and/or a glycidyl group-containing unsaturated vinyl monomer as a pigment dispersion stabilizer. This discovery has led to the present invention The present invention provides a cationic aqueous pigment dispersion comprising a pigment, a dispersing agent and an aqueous medium, in which the dispersing agent is an water-solubilized or water-dispersed product of a copolymer obtained by copolymerization of (A) 3 to 90 parts by weight of a modified vinylic unsaturated monomer having a fatty acid residue with at least 8 carbon atoms at the molecular terminal (to be referred to as the "modified vinylic monomer"), (B) 2 to 90 parts by weight of a nitrogen-containing macromonomer having at least one radical-polymerizable functional group selected from acryloyloxy, methacryloyloxy, allyloxy and an aromatic vinyl group at one end (to be referred to as the "nitrogen-containing macromonomer"), (C) 1 to 50 parts by weight of at least one vinylic monomer (to be referred to as the "vinylic monomer") selected from aminoalkyl (meth)acrylates, aminoalkyl-(meth)acrylamides and glycidyl group-containing vinylic unsaturated monomers, (D) 0 to 91 parts by weight of an unsaturated monomer having a nitrogen-containing heterocyclic ring, and (E) 0 to 91 parts by weight of an alpha,beta-ethylenically unsaturated monomer other than (A), (B), (C) and (D) above.

In the present invention, the copolymer used as the dispersing agent has such a structure that the strongly hydrophobic long-chain components are bonded while being separated from the main chain of the polymer containing the specific strongly hydrophilic nitrogen-containing monomer derived from the macromonomer. When the pigment is dispersed in water in the presence of this copolymer as dispersant, the functional groups of the copolymer are adsorbed on, or chemically bound to, the pigment particles, and on the other hand, the long-chain components of the polymer molecules separated from the main chain of the copolymer are entangled with each other to surround the pigment particles and thus form a strongly hydrophobic barrier layer. Furthermore, the hydrophilic component of the copolymer is dispersed in water. All this contributes to the formation of a stable dispersion of the pigment in the aqueous medium. Since the pigment particles are individually surrounded by a barrier layer having a component which is hydrophobic and has excellent hydrolysis resistance, intrusion of water, alkalies, etc. into the pigment particles is hampered. Furthermore, since the barrier layer is composed of a component having great steric hindrance, the pigment particles are prevented from approaching each other, and show excellent storage stability without sedimentation or flocculation. In addition, because the copolymer has surface-activating property with an excellent balance between hydrophobicity ascribed to the long-chain component and hydrophilicity ascribed to the macromonomer component, it has excellent pigment dispersing ability and the resulting aqueous pigment dispersion has excellent storage stability.

The nitrogen-containing component in the copolymer can be easily and accurately introduced as a result of using the macromonomer component. Furthermore, since the macromonomer component is a component having a high nitrogen content obtained by copolymerizing or homopolymerizing a nitrogen-containing unsaturated monomer, it is strongly adsorbed on and bound to the pigment, and consequently, the pigment dispersion obtained by using this copolymer as dispersant show excellent pigment dispersibility and storage stability.

The dispersing agent used in the aqueous dispersion of this invention will now be described in detail.

Modified vinylic monomer (A)

The modified vinylic monomer used as a component of the dispersant in this invention includes monomers containing a fatty acid residue having at least 8 carbon atoms at the molecular terminal and an ethylenically unsaturated bond, for example monomers obtained by modifying monomers containing an ethylenically unsaturated bond with a modifier such as oils and fats, fatty acids, aliphatic alcohols, glycidyl esters of fatty acids and aliphatic amines, all of which have at least 8 carbon atoms.

The monomers containing an ethylenically un saturated bond are monomers having functional groups such as a hydroxyl group, a carboxyl group, a glycidyl group, an isocyanate group and an aziridinyl group in the molecule. Specific examples include hydroxyl-containing unsaturated monomers, for example hydroxyalkyl (meth)acrylates such as hydroxyethyl (meth)acrylate and hydroxypropyl (meth)acrylate; carboxyl-containing unsaturated monomers such as (meth)acrylic acid, carboxyethyl(meth)acrylic acid, maleic acid or its anhydride and itaconic acid; glycidyl-containing unsaturated monomers such as glycidyl (meth)acrylate, allyl glycidyl ether and vinylphenyl glycidyl ether; isocyanate-containing unsaturated monomers such as an adduct of a diisocyanate compound (such as isophorone diisocyanate, toluene diisocyanate, xylene diisocyanate and diphenylmethane diisocyanate) and a hydroxyalkyl (meth)acrylate (mole ratio 1:1), alpha,alpha-dimethyl-m-isopropenylbenzyl isocyanate and isocyanateethyl (meth)acrylate; and aziridin-containing unsaturated monomers such as aziridinylethyl (meth)acrylate.

The modifier includes oils and fats, fatty acids, aliphatic alcohols, glycidyl esters of fatty acids and aliphatic amines which have at least 8 carbon atoms, preferably 10 to 24 carbon atoms. Specific examples include saturated fatty acids such as lauric acid, 2-ethylhexanoic acid and stearic acid; oils and fats such as coconut oil, olive oil, castor oil, safflower oil, linseed oil, soybean oil, sesame oil, tall oil, cottonseed oil and dehydrated castor oil, and fatty acids of these oils; aliphatic alcohols such as 2-ethylhexyl alcohol, lauryl alcohol and stearyl alcohol; glycidyl esters of fatty acids such as Cardura E (a registered trademark for a product of Shell Chemical Co.; a glycidyl ester of Versatic Acid); and aliphatic amines such as octylamine, dodecylamine and stearylamine.

Specific examples of the modified vinylic monomer (A) are shown below.

(i) Alkyl esters of (meth)acrylic acid

2-Ethylhexyl (meth)acrylate, lauryl (meth)acrylate and stearyl (meth)acrylate.

(ii) Adducts between glycidyl-containing unsaturated monomers and fatty acids (Japanese Laid-Open Patent Publication No. 227940/1984)

An adduct of glycidyl (meth)acrylate and safflower oil fatty acid.

(iii) Isocyanate-containing unsaturated monomers (Japanese Laid-Open Patent Publication No. 235466/1986;

The reaction product of a tolylene diisocyanate/2-hydroxyethyl methacrylate (mole ratio 1/1) adduct with oleyl alcohol.

(iv) Esterification products between hydroxyl-containing unsaturated monomer and fatty acids An esterification product between 2-hydroxyethyl methacrylate and linseed oil fatty acid.

(v) Adducts between aziridin-containing unsaturated monomers and fatty acids

An adduct of aziridinylethyl methacrylate and linseed oil fatty acid.

Nitrogen-containing macromonomer (B)

The macromonomer used as a component of the dispersing agent used in this invention consists of a polymer obtained by polymerizing a nitrogen-containing unsaturated monomer as a main chain with one end of the main chain having a radical polymerizable unsaturated group such as acryloyloxy, methacryloyloxy, allyloxy, or an aromatic vinyl group (such as styryl).

The nitrogen-containing unsaturated monomer component constituting the molecular chain is obtained by, for example, homopolymerizing or copolymerizing at least one unsaturated monomer having a nitrogen-containing heterocyclic ring or at least one nitrogen-containing derivative of (meth)acrylic acid.

The macromonomer (B) will be described below in more detail.

[1] The unsaturated monomer having a nitrogen-containing heterocyclic ring includes, for example, monomers having a monocyclic or polycyclic hetero ring containing 1 to 3, preferably 1 or 2, ring nitrogen atoms bonded to the vinyl group. Specific examples are shown below.

(I) Vinylpyrrolidones

1-Vinyl-2-pyrrolidone and 1-vinyl-3-pyrrolidone.

(II) Vinylpyridines

2-Vinylpyridine, 4-vinylpyridine, 5-methyl-2-vinylpyridine and 5-ethyl-2-vinylpyridine.

(III) Vinylimidazoles

1-Vinylimidazole and 1-vinyl-2-methylimidazole.

(IV) Vinylcarbazoles

N-vinylcarbazole.

(v) Vinylquinolines

2-Vinylquinoline.

(VI) Vinylpiperidines

3-Vinylpiperidine and N-methyl-3-vinylpiperidine.

(VII) Others

N-(meth)acryloyl morpholine represented by the following formula

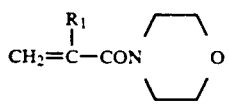

wherein $R_1$ represents a hydrogen atom or a methyl group, and N-(meth)acryloylpyrrolidine represented by the following formula

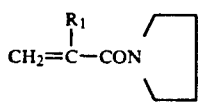

wherein $R_1$ is as defined.

Of these unsaturated monomers having a nitrogen-containing heterocyclic ring, the vinylpyrrolidones, vinylimidazoles and vinylcarbazoles are preferred. Especially preferred are those in which the ring nitrogen atoms are tertiary.

[2] The nitrogen-containing derivative of (meth)acrylic acid includes (meth)acrylic acid esters having a substituted or unsubstituted amino group at the ester moiety, (meth)acrylamide, and (meth)acrylamide having a substituted amino group at the amide moiety. Especially preferred are aminoalkyl (meth)acrylates and (meth)acrylamides represented by the following formulae (I) to (III).

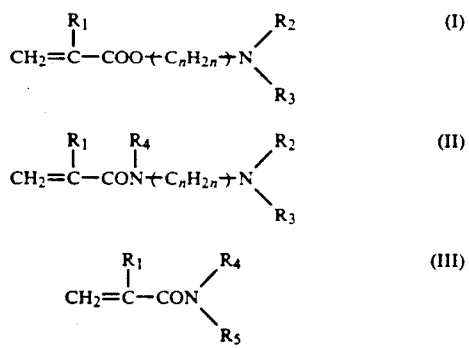

In the above formulae, $R_1$ is as defined above; $R_2$ and $R_3$ independently represent a hydrogen atom or a lower alkyl group; $R_4$ represents a hydrogen atom or a lower alkyl group; $R_5$ represents a hydrogen atom, a lower alkyl group, a di(lower alkyl)amino-lower alkyl group; a hydroxy-lower alkyl group or a lower alkoxy-lower alkyl group., and n represents an integer of 2 to 8. The term "lower" used here means that a group qualified by this term has not more than 6, preferably not more than 4, carbon atoms.

Specific examples of the aminoalkyl (meth)acrylates of formula (I) include N,N-dimethylaminoethyl (meth)acrylate, N,N-diethylaminoethyl (meth)acrylate, N-t-butylaminoethyl (meth)acrylate, N,N-dimethylaminopropyl (meth)acrylate, N,N-dimethylaminobutyl (meth)acrylate, N-propylaminoethyl (meth)acrylate and N-butylaminoethyl (meth)acrylate. Examples of the aminoalkyl (meth)acrylamides of formula (II) include N,N-dimethylaminoethyl(meth)acrylamide and N,N-dimethylaminopropyl(meth)acrylamide. Examples of the (meth)acrylamides of formula (III) include (meth)acrylamide, N-methyl(meth)acrylamide, N-ethyl(meth)acrylamide, N-butyl(meth)acrylamide, N,N-dimethyl(meth)acrylamide, N,N-diethyl(meth)acrylamide, N,N-dipropyl(meth)acrylamide, N-methylol(meth)acrylamide, N-ethoxymethyl(meth)acrylamide, N-butoxymethyl(meth)acrylamide, and N,N-dimethylaminopropylacrylamide. Most preferably, the nitrogen atoms present in these nitrogen-containing (meth)acrylic monomers are made tertiary. Those in which the nitrogen atoms are made secondary may be preferably used. Among them, N,N-dimethylacrylamide and N,N-dimethylaminopropyl(meth)acrylamide having excellent resistance to hydrolysis are especially preferred.

The alpha,beta-ethylenically unsaturated nitrogen-containing monomers mentioned above may be used singly or in combination.

The macromonomer used in this invention may be prepared by a known method, for example, by polymerizing the nitrogen-containing (meth)acrylic monomer in the presence of a chain transfer agent having a carboxyl group such as thioglycollic acid and a polymerization initiator such as azobisisobutyronitrile and benzoyl peroxide to form a prepolymer having the carboxyl group at one end, or polymerizing the monomer in the presence of an azoic polymerization initiator having a carboxyl group such as azobiscyanovaleric acid and a tertiary amine to form a prepolymer having the carboxyl group at one; and reacting the prepolymer with a vinylic monomer having a functional group capable of reacting with the carboxyl group of the prepolymer. Typical examples of the vinylic monomer used in the above reaction include monomers containing an acryloyloxy or methacryloyloxy group such as glycidyl acrylate, glycidyl methacrylate, 2-hydroxyethyl acrylate, 2-hydroxyethyl methacrylate, 2-hydroxypropyl acrylate and 2-hydroxypropyl methacrylate; monomers containing an allyloxy group such as allyl alcohol and allyl glycidyl ether; and monomers having an aromatic vinyl group such as p-isopropenylphenyl glycidyl ether and p-vinylphenyl glycidyl ether.

If the molecular weight of the macromonomer used in this invention is too low, the resulting aqueous pigment dispersion has inferior storage stability. If it is too high, the balance between the molecular weight of the main chain and the molecular weight of the side chain is lost, the dispersibility of the pigment, and the storage stability of the aqueous pigment dispersion tend to be degraded. The suitable number average molecular weight of the macromonomer is generally in the range of 500 to 15,000, preferably 700 to 10,000.

Vinylic monomer (C)

Aminoalkyl (meth)acrylates or aminoalkyl(meth)acrylamide monomers conveniently used as the vinylic monomer (C) in the dispersing agent in this invention are, for example, the monomers represented by formulae (I) and (II) given above. From the standpoint of pigment dispersibility in water and the storage stability (excellent hydrolysis resistance) of the aqueous pigment dispersion, the aminoalkyl(meth)acrylamides of formula (II), above all N,N-dimethylaminopropyl(meth)acrylamide are most preferred.

Glycidyl-containing vinylic unsaturated monomers may also be used as the vinylic monomer (C). Specific examples are glycidyl (meth)acrylate, allyl glycidyl ether and vinylphenyl glycidyl ether.

Unsaturated monomers having a nitrogen-containing heterocyclic ring (D)

The unsaturated monomers having a nitrogen-containing heterocyclic ring described above with respect to the nitrogen-containing macromonomer (B), for example, may be used as the monomer (D). Vinylpyrrolidones, especially N-vinyl-2-pyrrolidone, are especially preferred from the standpoint of pigment dispersibility and hydrolysis resistance.

Other alpha,beta-ethylenically unsaturated monomers (E)

The alpha,beta-ethylenically unsaturated monomers (E) other than the components (A), (B), (C) and (D) are not particularly restricted, and may be chosen from a wide variety of compounds according to the properties required of the dispersing agent used in this invention. Typical examples of these unsaturated monomers are shown below.

(a) Esters of acrylic or methacrylic acid $C_1$–$C_7$ alkyl esters of acrylic or methacrylic acid such as methyl acrylate, ethyl acrylate, propyl acrylate, isopropyl acrylate, butyl acrylate, hexyl acrylate, methyl methacrylate, ethyl methacrylate, propyl methacrylate, isopropyl methacrylate, butyl methacrylate and hexyl methacrylate; $C_2$–$C_7$ alkoxyalkyl esters of acrylic or methacrylic acid such as methoxybutyl acrylate, methoxybutyl methacrylate, methoxyethyl acrylate, methoxyethyl methacrylate, ethoxybutyl acrylate and ethoxybutyl methacrylate; $C_2$–$C_7$ alkenyl esters of acrylic or methacrylic acid such as allyl acrylate and allyl methacrylate; $C_2$–$C_7$ hydroxyalkyl esters of acrylic or methacrylic acid such as hydroxyethyl acrylate, hydroxyethyl methacrylate, hydroxypropyl acrylate and hydroxypropyl methacrylate; $C_3$–$C_7$ alkenyloxyalkyl esters of acrylic or methacrylic acid such as allyloxyethyl acrylate and allyloxy methacrylate; and $C_3$–$C_7$ carboxyalkyl esters of acrylic or methacrylic acid such as 2-carboxyethyl acrylate

(b) Vinyl aromatic compounds

Styrene, alpha-methylstyrene, vinyltoluene and p-chlorostyrene.

(c) Polyolefinic compounds

Butadiene, isoprene and chloroprene.

(d) alpha,beta-Ethylenically unsaturated carboxylic acids

Acrylic acid, methacrylic acid, maleic acid and itaconic acid.

(e) Other unsaturated monomers

Acrylonitrile, methacrylonitrile, methyl isopropenyl ketone, vinyl acetate, vinyl propionate and PLACCEL FM-3 and PLACCEL FM-5 (tradenames for epsilon-caprolactone-modified vinyl monomers produced by Daicell Chemical Industry Co. Ltd.)

These unsaturated monomers are properly chosen according to the properties required of the final aqueous pigment dispersion. They may be used either singly or in combination.

According to this invention, the modified vinylic monomer (A), the nitrogen-containing macromonomer C), the unsaturated monomer (D) (B), the vinylic monomer having a nitrogen-containing heterocyclic ring and the alpha,beta-ethylenically unsaturated monomer (E) are copolymerized with one another. The copolymerization may be carried out by methods known per se for production of (meth)acrylic copolymers, for example by a solution polymerization technique, an emulsion polymerization technique or a suspension polymerization technique.

The proportions of the five components to be copolymerized may be varied according to the desired properties of the copolymer for use as a dispersant. The suitable proportions are as follows per 100 parts by weight of the components (A) to (D) combined (the same weight of the components (A) to (D) combined (the same basis in the specification and the appended claims).

Modified vinylic monomer (A): 3 to 90 parts by weight, and for pigment dispersibility and storage stability, preferably 10 to 85 parts by weight, more preferably 15 to 70 parts by weight.

Nitrogen-containing macromonomer (B): 2 to 90 parts by weight, and for pigment dispersibility and storage stability, 3 to 70 parts by weight, more preferably 4 to 60 parts by weight.

Vinylic monomer (C): 1 to 50 parts by weight, and for good solubility in water and good film properties, to 40 parts by weight, more preferably 3 to 35 parts by weight.

Unsaturated monomer (D) having a nitrogen-containing heterocyclic ring: 0 to 91 parts by weight, and for good solubility in water and good film properties, 5 to 80 parts by weight, more preferably 8 to 70 parts by weight.

alpha,beta-Unsaturated monomer (E) other than (A) to (D): 0 to 91 parts by weight, and for good film properties, preferably 5 to 85 parts by weight, more preferably 7 to 80 parts by weight.

Advantageously, it is preferred to carry out the above copolymerization in accordance with the solution polymerization technique. By this technique, the five components may be reacted in a suitable inert solvent in the presence of a polymerization catalyst at a reaction temperature of usually about 0° to 180° C., preferably about 40° to 170° C., for about 1 to 20 hours, preferably about 6 to 10 hours.

Desirably, the solvent used should be miscible with water and dissolve the resulting copolymer, and particularly should not have to be removed in the preparation of a cationic aqueous pigment dispersion. Examples of solvents having these characteristics include Cellosolve solvents of the formula $HO-CH_2CH_2-OR_6$ wherein $R_6$ represents a hydrogen atom or an alkyl group having 1 to 8 carbon atoms, such as ethylene glycol, butyl Cellosolve and ethyl Cellosolve; propylene glycol solvents of the formula

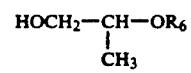

in which $R_6$ is as defined, such as propylene glycol monomethyl ether; carbitol solvents of the formula $HO-CH_2CH_2-OCH_2CH_2-OR_6$ in which $R_6$ is as defined, such as diethylene glycol, methylcarbitol and butylcarbitol; glyme solvents of the formula $R_7O-CH_2CH_2-OR_8$ in which $R_7$ and $R_8$ each represent an alkyl group having 1 to 3 carbon atoms, such as ethylene glycol dimethyl ether; diglyme solvents of the formula $R_7O-CH_2CH_2OCH_2-CH_2OR_8$ in which $R_7$ and $R_8$ are as defined, such as diethylene glycol dimethyl ether; Cellosolve acetate solvents of the formula $R_9$—$CH_2C_2OCO$—$CH_3$ in which $R_9$ represents methyl or ethyl, such as ethylene glycol monoacetate and methyl Cellosolve acetate; alcohol solvents of the formula $R_{10}OH$ in which $R_{10}$ represents an alkyl group having 1 to 4 carbon atoms, such as ethanol, propanol and butanol; and diacetone alcohol, dioxane, tetrahydrofuran, acetone, dimethylformamide and 3-methoxy-3-methyl-butanol.

Water-immiscible inert solvents may also be used. Preferably the water-immiscible solvents have a boiling point of not more than 250° C. so that they can be easily removed by distillation under atmospheric or reduced pressure after the polymerization reaction. Examples of solvents of this type include aromatic hydrocarbons represented by the formula

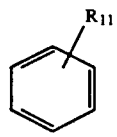

in which $R_{11}$ represents a hydrogen atom or an alkyl group having 1 to 4 carbon atoms,

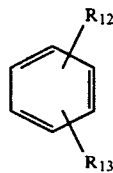

in which $R_{12}$ and $R_{13}$ each represent an alkyl group having 1 to 4 carbon atoms, such as toluene and xylene; acids or esters represented by the formula $R_{14}$—COO—$R_{15}$ in which $R_{14}$ represents an alkyl group having 1 to 6 carbon atoms, and $R_{15}$ represents a hydrogen atom, an alkyl group having 1 to 6 carbon atoms, or a cyclohexyl group, such as acetic acid, ethyl formate, butyl acetate and cyclohexyl acetate; ketones represented by the formula $R_{16}R_{17}C=O$ in which $R_{16}$ and $R_{17}$ each represent an alkyl group having 1 to 8 carbon atoms and

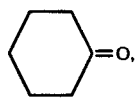

such as methyl ethyl ketone and cyclohexanone; ethers represented by the formula $R_{16}$—O—$R_{17}$ in which $R_{16}$ and $R_{17}$ are as defined, such as ethyl ether and hexyl ether; and alcohols of the formula $R_{18}$ in which $R_{18}$ represents an alkyl group having 5 to 11 carbon atoms, such as hexanol.

The solvent may be used in an amount of 15 to 90% by weight based on the total weight of the five components (A) to (E).

The polymerization catalyst may be any one of radical initiators which can be used in usual radical polymerization, for example azo compounds, peroxide compounds, sulfides, sulfines, sulfinic acids, diazo compounds, nitroso compounds or redox systems. Ionizing radiation may also be used.

Even when the molecular weight of the copolymer varies, the resulting aqueous pigment dispersion is substantially satisfactory. If, however, its molecular weight is too low, the physical properties of a coated film prepared from a water-base paint prepared by using the aqueous pigment dispersion might be degraded. If, on the other hand, it is too high, the copolymer has a high viscosity. If its viscosity is lowered, the concentration of the copolymer is lowered, and the dispersibility of a pigment in it is reduced. Accordingly, it is generally advantageous to perform the copolymerization until the resulting copolymer has a number average molecular weight of about 700 to about 150,000, preferably about 1,000 to about 100,000.

The copolymer so obtained may generally have an amino group equivalent of at least 0.02 milliequivalent/g of copolymer, preferably at least 0.2 milliequivalent/g of copolymer, more preferably 0.2 to 3.0 milliequivalent/g of copolymer.

The resulting copolymer, either as such or after evaporation of the solvent, is water-solubilized or water-dispersed. When the copolymer has an aminoalkyl (meth)acrylic monomer as a monomer component, its water-solubilization or water-dispersing may be carried out by, for example, neutralizing the amino groups derived from the monomer components (B) and (C) with a conventional neutralizing agent or converting them into quaternary ammonium groups, and then dissolving or dispersing the copolymer in water. Suitable neutralizing agents used for this purpose include, for example, organic acids such as formic acid, acetic acid, propionic acid, butyric acid, hydroxyacetic acid and lactic acid, and inorganic acids such as boric acid, hydrochloric acid, phosphoric acid and sulfuric acid. Formic acid and acetic acid are especially preferred.

The neutralization treatment may be carried out easily in a customary manner by adding the neutralization agent or its aqueous solution to the resulting copolymer or its solution. The amount of the neutralizing agent used is generally 0.1 to 2.0 equivalents, preferably 0.3 to 1.0 equivalent, based on the amino groups in the copolymer.

The quaternization may be carried out by reacting the copolymer with a 1,2-epoxy compound in the presence of an acid and/or water to convert secondary or tertiary amino groups in the copolymer into quaternary ammonium groups.

Compounds of the following formula (IV), for example, are suitable as the 1,2-epoxy compound used for quaternization.

(IV)

in which $R_1$ is as defined above, and $R_{19}$ represents a hydrogen atom, an alkyl group, a cycloalkyl group, a substituted or unsubstituted phenyl group, —$CH_2$—O—$R_{20}$ or,

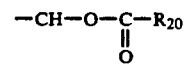

in which $R_{20}$ represents a hydrogen atom, an alkyl group, a cycloalkyl group, an alkenyl group, or a substituted or unsubstituted phenyl group. The alkyl and cycloalkyl groups represented by R 19 and/or $R_{20}$ may generally have 1 to 18 carbon atoms, preferably 1 to 8 carbon atoms. The alkenyl group may preferably have 2 to 6 carbon atoms. A lower alkyl group or a lower alkoxy group, for example, may be cited as a substituent on the phenyl group.

Typical examples of 1,2-epoxy compounds include ethylene oxide, propylene oxide, 1,2-butylene oxide, 1,2-pentylene oxide, 1,2-octylene oxide, styrene oxide, glycidol, glycidyl (meth)acrylate, glycidyl acetate, glycidyl laurate, Cardura E (a registered trademark for a glycidyl ester of Versatic Acid), a product of Shell Chemical Co.), butyl glycidyl ether, octyl glycidyl ether, phenyl glycidyl ether, p-tert-butylphenyl glycidyl ether and allyl glycidyl ether.

The amount of the 1,2-epoxy compound may be varied depending upon the type of the amino groups to be quaternized. Conveniently, it is 2 to 4 moles for secondary amino groups, and 1 to 2 moles for tertiary amino groups, both per mole of amino group.

Examples of the acid used in the quaternization include organic acids such as formic acid, acetic acid, lactic acid, (meth)acrylic acid, propionic acid, butyric acid, and hydroxyacetic acid, and inorganic acids such as boric acid, hydrochloric acid, phosphoric acid and sulfuric acid. Conveniently, the acid is used in an amount of about 1 to about 2 moles per amino group.

The suitable amount of water is about 0.5 to about 20 moles per amino group to be quaternized.

One suitable method of converting amino groups in the copolymer, which are derived from the aminoalkyl (meth)acrylic monomer (C), into quaternary ammonium groups comprises adding the 1,2-epoxy compound and water to a mixture of the copolymer and the acid, and reacting them at room temperature to about 120° C. for a period of about 1 to 7 hours. When the amino groups to be quaternized are secondary amino groups, it is possible to first convert the secondary amino groups into tertiary amino groups by reaction with the 1,2-epoxy compound, and then to convert the tertiary amino groups into quaternary ammonium groups.

When a glycidyl-containing vinylic unsaturated monomer is used as the monomer component (C) of the copolymer, the water-solubilization or water-dispersing of the copolymer may be carried out by, for example, reacting the glycidyl groups in the copolymer with a secondary amine (such as dimethylamine, diethylamine, monoethanolamine, diethanolamine, diisopropanolamine or morpholine) and treating the newly formed tertiary amino groups and the amino groups derived from the monomer component with the acidic, or by quaternizing the copolymer with the 1,2-epoxy compound in the presence of the acid and/or water as described above; and then dissolving or dispersing the copolymer in water. As an alternative, it is possible to react the copolymer with a tertiary amine such as triethylamine, tributylamine, triethanolamine or benzyldimethylamine in the presence of the same acid and/or water as used in the quaternization to convert the glycidyl groups in the copolymer into quaternary ammonium groups, and then dissolving or dispersing the copolymer in water.

The quaternized copolymer should contain quaternary ammonium groups in an amount sufficient to water-solubilize the copolymer. This amount differs depending upon the type or molecular weight of the copolymer. The suitable amount of the quaternary ammonium groups is generally 0.01 to 6 milliequivalents/g of copolymer, preferably 0.1 to 5.0 milliequivalents/g of copolymer, more preferably 0.1 to 3 milliequivalents/g of copolymer.

The dispersing agent composed of the water-solubilized or water-dispersed copolymer may be used in an amount of generally about 1 to about 500 parts by weight, preferably about 1 to about 300 parts by weight, per 100 parts by weight of the pigment. If the amount of the dispersing agent used exceeds the upper limit of the above-specified range, the tinctorial power and viscosity of the aqueous pigment dispersion tend to get out of balance. If it falls below the lower limit, the dispersion stability of the pigment is liable to decrease.

The aqueous medium that can be used in the cationic aqueous pigment dispersion of this invention is substantially water. As required, for example when the dispersing agent has a degree of hydrophilicity and does not have the sufficient ability to disperse pigment, a hydrophilic organic solvent may be used in combination. The same hydrophilic organic solvents used for the production of the above polymer may be used singly or in combination.

The pigment used in the cationic aqueous pigment dispersion of this invention may be an inorganic or organic pigment normally used in pigment dispersions of this type. Examples of the inorganic pigment are (1) oxide pigments such as zinc flower, titanium dioxide, red iron oxide, chromium oxide, cobalt blue and iron black, (2) hydroxide pigments such as alumina white and yellow iron oxide, (3) sulfide or selenide pigments such as zinc sulfide, vermilion, cadmium yellow and cadmium red, (4) ferrocyanide pigments such as prussian blue, (5) chromate pigments such as chrome yellow, zinc chromate and molybdenum red, (6) sulfate pigments such as precipitated barium sulfates, (7) carbonate pigments such as precipitated calcium carbonate, (8) silicate pigments such as hydrous silicates, clay and ultramarine blue, (9) phosphate pigments such as manganese violet, (10) carbonaceous pigments such as carbon black, and (11) metallic powder-type pigments such as aluminum powder, bronze powder and zinc powder. Examples of the organic pigment include (1) nitroso pigments such as Naphthol Green B, (2) nitro pigments such as Naphthol Yellow S, (3) azo pigments such as Lithol Red, Lake Red C, Fast Yellow, Naphthol Red and Red: (4) dye-deposited lake pigments such as Alkali Blue Lake and Rhodamine Lake, (5) phthalocyanine pigments such as Phthalocyanine Blue and Fast Sky Blue and (6) fused polycyclic pigments such as Perylene Red, Quinacridone Red, Dioxazine Violet and Isoindolinone Yellow.

The content of the pigment in the cationic aqueous pigment dispersion of this invention is not particularly limited technically. Generally, it is about 2 to about 90 % by weight, preferably 5 to 85 % by weight, based on the weight of the dispersion.

The cationic aqueous pigment dispersion of this invention can be prepared by mixing the above ingredients in a suitable dispersing device, for example a ball mill, a roll mill, a homomixer, a sand grinder, a shaker and an atriter which are normally used in the paint industry.

As required, a known surface active-agent or protective colloid may be added to the cationic aqueous pigment dispersion of this invention to increase dispersion stability.

In the resulting cationic aqueous pigment dispersion of this invention, the pigment is very uniformly and finely dispersed, and the pigment particles hardly flocculate or sediment even on long-term storage.

The cationic aqueous pigment dispersion of this invention has good miscibility with known water-soluble resins, water dispersible resins and emulsions heretofore used in water-base paints and aqueous ink, for example alkyd resins, acrylic resins, epoxy resins, urethane resins and maleinized polybutadiene, and is not restricted by the types of these resins. It can be widely used to color water-base paints comprising any of these resins. It is especially effective for cationic water-dispersible resins and polymerized emulsions which by themselves have poor pigment dispersibility. The amount of the cationic aqueous pigment dispersion of this invention to be incorporated in the water-base paint may be varied over a wide range depending upon the type of the pigment in the dispersion, the degree of coloration required of the final paint, etc. Generally, the pigment dispersion can be incorporated in an amount of about 2 to about 1000 parts by weight, preferably 3 to 800 parts by weight, per 100 parts by weight of the resin component of the water-base paint.

The following examples illustrate the present invention in more detail. In these examples, all parts and percentages are expressed by weight.

REFERENTIAL EXAMPLE (A-1)

| | |
|---|---|
| Safflower oil fatty acid | 236 parts |
| Glycidyl methacrylate | 119 parts |
| Hydroquinone | 0.4 part |
| Tetraethyl ammonium bromide | 0.2 part |

The above compounds were put in a reactor and reacted at a temperature of 140° to 150° C. with stirring to form a modified acrylic monomer (A-1) as an addition-reaction product. The addition-reaction between the epoxy groups and the carboxyl groups was monitored while measuring the amount of the residual carboxyl groups. A period of about 4 hours was required until the reaction came to completion.

REFERENTIAL EXAMPLE (A-2)

| | |
|---|---|
| Linseed oil fatty acid | 364 parts |
| Aziridinylethyl methacrylate | 208 parts |
| Hydroquinone | 0.6 part |

The above compounds were put in a reactor and reacted with stirring at a temperature of 140° to 150° C. The addition-reaction between the epoxy groups and the carboxyl groups was monitored while measuring the amount of the residual carboxyl groups. After a reaction period of about 4 hours, a modified acrylic monomer (A-2) was obtained.

REFERENTIAL EXAMPLE (A-3)

2-Hydroxyethyl methacrylate (278 parts), 208 parts of toluene diisocyanate and 0.1 part of hydroquinone were put in a reactor and reacted at 60° C. for 3 hours to obtain an isocyanate-containing unsaturated monomer. Oleyl alcohol (430 parts) was added to 486 parts of the resulting isocyanate-containing unsaturated monomer, and the mixture was maintained at 80° C. for 3 hours to obtain an unsaturated monomer having a urethane linkage (A-3).

REFERENTIAL EXAMPLE (B-1)

Ethanol (250 parts) was fed into a reactor and heated to 70° C. A monomer solution obtained by dissolving 12.5 parts of 4,4'-azobisisobutyronitrile in 250 parts of N-vinyl-2-pyrrolidone and a solution of 17.5 parts of mercaptoacetic acid in 80 parts of ethanol were separately added dropwise over 2 hours to polymerize the monomer. After the polymerization, the reaction mixture was cooled to 20° C., and put in 10,000 parts of diethyl ether to flocculate and sediment the product. The resulting powder was dried at 80° C. and 10 mmHg for 10 hours to give a powder having an acid value of 26.1.

Ethyl Cellosolve (213 parts) and 200 parts of the powder were added to another reactor, and heated to 70° C. to dissolve the powder completely. The solution was cooled to 20° C., and 13.2 parts of glycidyl methacrylate, 0.2 part of tetraethyl ammonium bromide and 0.3 part of hydroquinone were fed, and reacted at 120° C. for 5 hours to obtain a 49% macromonomer of N-vinyl-2-pyrrolidone having an acid value of 0.5 (B-1).

REFERENTIAL EXAMPLE (B-2)

Ethanol (200 parts) was fed into a reactor and heated to 70° C.. A solution composed of 100 parts of N-vinyl-2-pyrrolidone, 100 parts of ethanol and 20 parts of 4,4'-azobis(4-cyano)valeic acid was added dropwise over 2 hours. After the addition, the solution was cooled to 20° C., and put in 10,000 parts of diethyl ether to flocculate and sediment the reaction product. The resulting powder was dried at 80° C. and 10 mmHg for 10 hours to give a powder having an acid value of 34.2.

Ethyl Cellosolve (104 parts) and 95 parts of the above powder were fed into another reactor and heated to 70° C. Glycidyl methacrylate (8.3 parts), 0.2 part of tetraethyl ammonium bromide and 0.2 part of hydroquinone were fed and reacted at 115° C. for 5 hours to give a 50% macromonomer of N-vinyl-2-pyrrolidone having an acid value of 1.0 (B-2).

REFERENTIAL EXAMPLE (B-3)

Referential Example B-1 was repeated except that N,N-dimethylaminoacrylamide was used instead of N-vinyl-2-pyrrolidone in the same amount. A 51% macromonomer of N,N-dimethylaminoacrylamide having an acid value of 1.5 (B-3) was obtained.

EXAMPLE 1

Three hundred parts of n-butyl Cellosolve was put in a reactor and heated to 120° C. A mixture composed of 113 parts of the modified acrylic monomer (A-1), 186 parts of the macromonomer (B-1) and 44 parts of N,N-dimethylaminoethyl methacrylate and a mixture composed of 19 parts of azobisdimethylvaleronitrile and 50 parts of n-Butyl Cellosolve were separately added dropwise over 2 hours. The reaction was carried out while stirring the solution under introduction of nitrogen.

One hour after the end of the addition of the above mixtures, 2.5 parts of azobisisobutyronitrile was added to the reactor. Furthermore, two hours later, 2.5 parts of azobisisobutyronitrile was added to the reaction solution. The reaction was then carried out at 120° C. for 2 hours. After the reaction, the unreacted monomers and n-butyl Cellosolve were removed by distillation under reduced pressure to give a copolymer solution having a non-volatile content of 70.5 % and a Gardner viscosity (for a 40% n-butyl Cellosolve solution) of E.

Furthermore, 180 parts of the resulting copolymer solution was put in a reactor and heated to about 50° C., and 6.6 parts of an 88% aqueous solution of lactic acid was added. The mixture was heated to 90° C., and maintained at this temperature for 30 minutes. The reaction mixture was cooled to 50° C., and 4.7 parts of 1,2-butylene oxide and 5.5 parts of water were added. The mixture was heated to 110° C. and reacted at this temperature for 2.5 hours to perform quaternization. The resulting copolymer had a quaternary ammonium group content of about 0.25 milliequivalent/g of copolymer. The resulting water-solubilized copolymer was cooled to room temperature, and then water was added to form a 40%

A mixture of 8.3 parts of the dispersing agent (I) and 200 parts of titanium white pigment (Titanium White R-5N produced by Sakai Chemical Co.) was dispersed for 0.5 hour using a Red Devil disperser to give an aqueous pigment dispersion (a) of the invention.

In the same way as above, aqueous pigment dispersions (b) and (c) of the invention were prepared using the pigments and the dispersion agent shown in Table 1. The dispersion of pigments other than Titanium White was carried out for 1 hour.

The properties of the resulting cationic aqueous pigment dispersions are shown in Table 1.

The pigment dispersions and the water-soluble resins indicated in Table 2 below were fully mixed to form water-base paints (1) to (4). The film properties of these water-base paints are summarized in Table 2.

EXAMPLE 2

350 Parts of n-butyl Cellosolve was put in a reaction vessel and heated to 120° C. A mixture composed of 113 parts of the modified acrylic monomer (A-2), 252 parts of the macromonomer (B-2), 11 parts of N,N-dimethylaminoethyl methacrylate and 17 parts of azobisdimethylvaleronitrile was added dropwise to the solution at 120° C. over about 2 hours under a nitrogen stream while the reaction solution was stirred. The reaction mixture was worked up as in Example 1 to give a copolymer solution having a non-volatile content of 70.8 % and a Gardner viscosity (for a 40% n-butyl Cellosolve solution) of H. The copolymer solution (211 parts) was put in a reactor, and heated to about 50° C., and 3.5 parts of an 88% aqueous solution of lactic acid was added. The mixture was heated to 70° C., and 2.5 parts of 1,2-butylene oxide and 2 parts of water were added. The mixture was further heated to 110° C., and maintained at this temperature for about 3 hours to perform quaternization. The resulting polymer had a quaternary ammonium group content of about 0.2 milliequivalent/g of copolymer. Water was added to the water-solubilized copolymer to give a 40% dispersing agent (II).

Titanium White was dispersed in the same way as in Example 1 using the dispersing agent (II) to form an aqueous pigment dispersion (d).

The pigment dispersion (d) was fully mixed with the water-soluble resin indicated in Table 2 to prepare a water-base paint (5).

The properties of the pigment dispersion (d) and the film properties of the water-base paint (5) are shown in Tables 1 and 2.

EXAMPLE 3

A mixture of 113 parts of the unsaturated monomer (A-3), 230 parts of the macromonomer (B-3) and 44 parts of N,N-dimethylaminoethyl methacrylate and a mixture of 17 parts of azobisdimethylavaleronitrile and 50 parts of n-butyl Cellosolve were subjected to the same polymerization reaction as described in Example 1. There was obtained a copolymer solution having a non-volatile content of 70.5% and a Gardner viscosity (for a 40% n-butyl Cellosolve solution) of B. Furthermore, 180 parts of the copolymer solution was put in a reactor, and heated to about 50° C. After adding 6.6 parts o-f an 88% aqueous solution of lactic acid, the mixture was heated to 80° C., and 4.7 parts of 1,2-butylene oxide and 35 parts of water were added. Furthermore, the reaction was carried out at a temperature of 110° C. for about 2.5 hours to perform quaternization. The resulting copolymer had a quaternary ammonium group content of about 0.3 milliequivalent/g of copolymer. Water was added to the water-solubilized copolymer to form a 40% dispersing agent (III).

Titanium White was dispersed in the same way as in Example 1 using the dispersing agent (III) to prepare an aqueous pigment dispersion (e) of this invention.

The pigment dispersion (e) was fully mixed with the water-soluble resin indicated in Table 2 to prepare a water-base paint (6).

The properties of the pigment dispersion (e) and the film properties of the water-base paint (6) are shown in Tables 1 and 2.

EXAMPLE 4

A mixture composed of 102 parts of stearyl methacrylate, 184 parts of macromonomer (B-1), 11 parts of acrylic acid and 44 parts of N,N-dimethylaminopropylmethacrylamide and a mixture composed of 17 parts of azobisdimethylvaleronitrile and 50 parts of n-butyl Cellosolve were subjected to the same polymerization as in Example 1 to give a copolymer solution having a non-volatile content of 70.5% and a Gardner viscosity (for a 40% n-butyl Cellosolve solution) of J. Furthermore, 180 parts of the copolymer solution was put in a reactor and heated to about 50° C. After 7.7 g of acetic acid was added, the mixture was heated to 80° C., and 9.5 parts of 1,2-butylene oxide and 10.0 parts of water were added. The mixture was heated to 110° C. and reacted for about 3.5 hours to perform quaternization. The resulting copolymer had a quaternary ammonium group content of about 0.5 milliequivalent/g of copolymer. Water was added to the water-solubilized copolymer to give a 40% dispersing agent (IV).

Titanium White was dispersed in the same way as in Example 1 using the dispersant (IV) to prepare an aqueous pigment dispersion (f).

The pigment dispersion (f) was fully mixed with the water-soluble resin indicated in Table 2 to prepare a water-base paint (7).

The properties of the pigment dispersion (f) and the film properties of the water-base paint (7) are shown in Tables 1 and 2.

EXAMPLE 5

A mixture composed of 93 parts of the modified acrylic monomer (A-1), 100 parts of the macromonomer (B-2), 33 parts of N-vinylpyrrolidone, 44 parts of N,N-dimethylaminoethyl methacrylate and 30 parts of n-butyl methacrylate and a mixture composed of 18 parts of azobisdimethylvaleronitrile and 50 parts of n-butyl Cellosolve were subjected to the same polymerization reaction as in Example 1 to give a copolymer solution having a non-volatile content of 71.0% and a Gardner viscosity (for a 40% n-butyl Cellosolve solution) of H. Furthermore, 180 parts of the copolymer solution was put in a reactor, and heated to about 50° C. After adding 13.2 parts of an 88% aqueous solution of lactic acid, the mixture was heated to about 90° C. Butyl glycidyl ether (17.5 parts) and 8.0 parts of water were added, and the mixture was maintained at 120° C. for about 3 hours to perform quaternization. The resulting copolymer had a quaternary ammonium group content of about 0.45 milliequivalent/g of copolymer. Water was added to the water-solubilized copolymer to prepare a 40% dispersing agent (V).

Titanium White was dispersed in the sam[way as in Example 1 using the dispersing agent (V) to prepare an aqueous pigment dispersion (g) of the invention.

The pigment dispersion (g) was mixed fully with the water-soluble resin indicated n Table 2 to prepare a water-base paint (8).

The properties of the pigment dispersion (g) and the film properties of the water-base paint (8) are shown in Tables 1 and 2.

COMPARATIVE EXAMPLE 1

A copolymer having a non-volatile content of 70.4% and a Gardner viscosity (for a 40% n-butyl Cellosolve solution) of F was prepared by performing the same polymerization reaction as in Example 1 except that 93 parts of N-vinyl-2-pyrrolidone was used instead of the macromonomer (B-1). The copolymer was quaternized as in Example 1 to give a 40% dispersing agent (VI).

Titanium White was dispersed in the same way as in Example 1 using the dispersing agent (VI) to prepare an aqueous pigment dispersion (h).

The pigment dispersion (h) was fully mixed with the water-soluble resin shown in Table 2 to prepare a water-base paint (9).

The properties of the pigment dispersion (h) and the film properties of the water-base paint (9) are shown in Tables 1 and 2.

The film properties in the above examples were measured by the following methods.

Sample preparation

An aqueous dryer ("Dicnate", a tradename for a product of Dainippon Ind and Chemicals, Inc.; containing of cobalt metal) was added to each of the water-base paints (1) to (9) in an amount of 1 part per 100 parts of the resin solids. The mixture was coated on a mild steel plate, and dried for 3 days at a temperature of 20° C. and a relative humidity of 75%.

Crosscut tape test

One hundred square cuts with each side measuring 1 mm were formed on the surface of the sample, and an adhesive Cellophane tape was applied to the cut surface and then forcibly peeled off.

Water resistance

The sample was immersed for 2 days in tap water at 20° C., and the state of the coated surface was examined with unaided eyes.

TABLE 1

| Item | Pigment dispersion | Example 1 (a) | (b) | (c) | 2 (d) | 3 (e) | 4 (f) | 5 (g) | Comparative Example (h) |
|---|---|---|---|---|---|---|---|---|---|
| Dispersant | (I) | 8.3 | 16.2 | 7.5 | | | | | |
| | (II) | | | | 8.3 | | | | |
| | (III) | | | | | 8.3 | | | |
| | (IV) | | | | | | 8.3 | | |
| | (V) | | | | | | | 8.3 | |
| | (VI) | | | | | | | | 8.3 |
| Pigment (*1) | Titanium White R-5N | 200 | | | 200 | 200 | 200 | 200 | 200 |
| | Carbon MA | | 60 | | | | | | |
| | Copper Phthalocyanine Green | | | 90 | | | | | |
| Properties | Pigment/dispersing agent (weight ratio of solids) | 60/1 | 9/1 | 30/1 | 60/1 | 60/1 | 60/1 | 60/1 | 60/1 |
| | Pigment content (wt. %) | 75.0% | 34.3% | 55.0% | 67.0% | 65.0% | 75.2% | 74.3% | 75.0% |
| | Particle size (μ) (*2) | 5 | 5 | 5 | 5 | 5 | 5 | 5 | 5 |
| | Viscosity (60 rpm, poise) (*3) | 14 | 27 | 2.0 | 13 | 20 | 15 | 18 | 18 |
| Storage stability (20° C., 1 week) | State | No change | No change | No change | No change | No change | No change | No change | Hard caking |
| | Viscosity (60 rpm, poise) (*3) | 13 | 26 | 1.8 | 13 | 19 | 16 | 17 | |

(*1): Titanium White R-5N (titanium dioxide produced by Sakai Chemical Co.); Carbon MA (carbon black produced by Mitsubishi Chemical Co., Ltd.).
(*2): Measured by ASTM D1201-64.
(*3): B-type viscometer

TABLE 2

| Item | Water-base paint | Example 1 (1) | (2) | (3) | (4) | 2 (5) | 3 (6) | 4 (7) | 5 (8) | Comparative Example (9) |
|---|---|---|---|---|---|---|---|---|---|---|
| Pigment dispersion | (a) | 10 | 10 | | | | | | | |
| | (b) | | | 10 | | | | | | |
| | (c) | | | | 10 | | | | | |
| | (d) | | | | | 10 | | | | |
| | (e) | | | | | | 10 | | | |
| | (f) | | | | | | | 10 | | |
| | (g) | | | | | | | | 10 | |
| | (h) | | | | | | | | | 10 |
| Water-soluble | Water-dispersible cationic resin | 23.4 | | 137.5 | 65.3 | 23.4 | 23.4 | 23.4 | 23.4 | 23.4 |

TABLE 2-continued

| Item | Water-base paint | Example 1 (1) | (2) | (3) | (4) | 2 (5) | 3 (6) | 4 (7) | 5 (8) | Comparative Example (9) |
|---|---|---|---|---|---|---|---|---|---|---|
| resin | (*4) | | | | | | | | | |
| | Cationic emulsion (*5) | | 31.2 | | | | | | | |
| Pigment/resin solids weight ratio | | 0.8/1.0 | 0.8/1.0 | 0.05/1.0 | 0.2/1.0 | 0.8/1.0 | 0.8/1.0 | 0.8/1.0 | 0.8/1.0 | 0.8/1.0 |
| Film properties | Thickness (μ) | 35 | 45 | 35 | 34 | 35 | 36 | 38 | 34 | 36 |
| | Gloss (80°) | 94 | 88 | 96 | 85 | 93 | 92 | 95 | 93 | 82 |
| | Crosscut tape adhesion | Good | Good | Good | Good | Good | Good | Good | Good | Good |
| | Water resistance | No change | No change | No change | No change | No change | No change | No change | No change | No change |
| | Pencil hardness | H | B | H | H | H | H | H | H | H |

Note to Table 2
(*4): Epon 1002, cationic resin composed of a polyamide resin and blocked diphenylmethane diisocyanate; amine value (milliequivalents/g of resin) = 1.0; resin viscosity (for a 60% n-butyl Cellosolve solution) = Z; n-butyl Cellosolve content 30% by weight; neutralized with acetic acid to 0.3 equivalent; water is added to form an emulsion having a solids content of 40%.
(*5): Cationic styrene/butadiene latex (solids content 30%) available under the tradename "Cementex-C" (a product of Obanaya Industry Co., Ltd.).

Coated film curing conditions

For paint (2), drying at 20° C. (relative humidity 75%) for 7 days; and heating at 180° C. for 30 minutes for all other paints.

I claim:

1. A cationic aqueous pigment dispersion comprising a pigment, a dispersing agent and an aqueous medium, in which the dispersing agent is a water-solubilized or water-dispersed product of a copolymer obtained by copolymerization of
   (A) 3 to 90 parts by weight of a vinylic unsaturated monomer having a fatty acid residue with at least 8 carbon atoms at the molecular terminal and being obtained by reaction of an ethylenically unsaturated monomer substituted by a hydroxyl group, a carboxyl group, a glycidyl group, an isocyanate group or an aziridinyl group with a member selected from the group consisting of oils, fats, aliphatic alcohols, glycidyl esters of fatty acids and aliphatic amines which have at least 8 carbon atoms,
   (B) 2 to 90 parts by weight of a nitrogen-containing macromonomer having at least one radical-polymerizable functional group at one end thereof, selected from acryloyloxy, methacryloyloxy, allyloxy and aromatic vinyl groups,
   (C) 1 to 50 parts by weight of at least one vinylic monomer other than (A) above, selected from aminoalkyl (meth)acrylates, aminoalkyl-(meth)acrylamides, glycidyl methacrylate, allyl glycidyl ether and vinylphenylglycidyl ether,
   (D) 0 to 91 parts by weight of an unsaturated monomer other than (B) above having a nitrogen-containing heterocyclic ring, and
   (E) 0 to 91 parts by weight of an alpha, beta-ethylenically unsaturated monomer other than (A), (B), (C) and (D) above.

2. The dispersion of claim 1 wherein the nitrogen-containing macromonomer (B) is a compound resulting from introduction of at least one radical polymerizable functional group selected from acryloyloxy, methacryloyloxy, allyloxy and an aromatic vinyl group into one end of the main chain of a homo- or co-polymer of a nitrogen-containing unsaturated monomer selected from unsaturated monomers having a nitrogen-containing heterocyclic ring and nitrogen-containing derivatives of (meth)acrylic acid.

3. The dispersion of claim 2 wherein the unsaturated monomer having a nitrogen-containing heterocyclic ring is at least one monomer selected from vinylpyrrolidones, vinylimidazoles and vinylcarbazoles.

4. The dispersion of claim 2 wherein the nitrogen-containing derivative of (meth)acrylic acid is selected from aminoalkyl (meth)acrylates and (meth)acrylamides represented by the following formula (I) to (III)

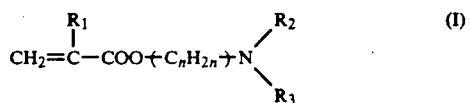

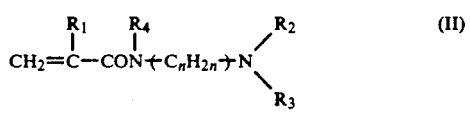

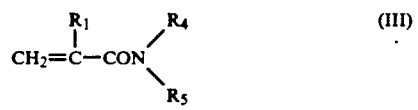

in which $R_1$ represents a hydrogen atom or a methyl group, $R_2$ and $R_3$ independently represents a hydrogen atom or a $C_1$–$C_6$ alkyl group, $R_4$ represents a hydrogen atom or a $C_1$–$C_6$ alkyl group, $R_5$ represents a hydrogen atom, a $C_1$–$C_6$ alkyl a hydroxy-$C_1$–$C_6$ alkyl group or a $C_1$–$C_6$ alkoxy-$C_1$–$C_6$ alkyl group, and n represents an integer of 2 to 8.

5. The dispersion of claim 2 wherein the nitrogen-containing derivative of (meth)acrylic acid is N,N-dimethylacrylamide or N,N-dimethylaminopropyl(meth)acrylamide.

6. The dispersion of claim 1 wherein the macromonomer has a number average molecular weight of 500 to 15,000.

7. The dispersion of claim 1 wherein the amino-alkyl (meth)acrylates and aminoalkyl-(meth)acrylamides (C) are represented by the following formula (I) to (III)

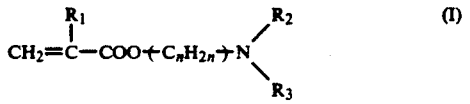

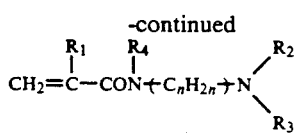

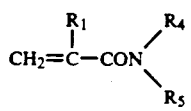

in which $R_1$ represents a hydrogen atom or a methyl group, $R_2$ and $R_3$ independently represent a hydrogen atom or a $C_1$–$C_6$ alkyl group, $R_4$ represents a hydrogen atom or a $C_1$–$C_6$ alkyl group, $R_5$ represents a hydrogen atom, a $C_1$–$C_6$ alkyl group, a di($C_1$–$C_6$ alkyl)amino-$C_1$–$C_6$ alkyl group, a hydroxy-$C_1$–$C_6$ alkyl group or a $C_1$–$C_6$ alkoxy-$C_1$–$C_6$ alkyl group, and n represents an integer of 2 to 8.

8. The dispersion of claim 7 wherein the vinylic monomer (C) is an aminoalkyl-(meth)acrylamide of formula (II).

9. The dispersion of claim 8 wherein the aminoalkyl-(meth)acrylamide is N,N-dimethylaminopropyl(meth)acrylamide.

10. The dispersion of claim 1 wherein the unsaturated monomer (D) having a nitrogen-containing heterocyclic ring is selected from vinylpyrrolidones, vinylpyridines, vinylimidazoles, vinylcarbazoles, vinylquinolines and vinylpiperidines.

11. The dispersion of claim 10 wherein the unsaturated monomer (D) having a nitrogen-containing heterocyclic ring is N-vinyl-2-pyrrolidone.

12. The dispersion of claim 1 wherein the alpha,beta-ethylenically unsaturated monomer (E) is at least one monomer selected from esters of (meth)acrylic acid, vinyl aromatic compounds, compounds containing more than one ethylenic unsaturation and alpha,beta-ethylenically unsaturated carboxylic acids.

13. The dispersion of claim 1 wherein the dispersing agent is a water-solubilized or water-dispersed product of a copolymer obtained by copolymerization of 10 to 85 parts by weight of the vinylic unsaturated monomer (A), 3 to 70 parts by weight of the nitrogen-containing macromonomer (B), 2 to 40 parts by weight of the vinylic monomer (C), 5 to 80 parts by weight of the unsaturated monomer (D) having a nitrogen-containing heterocyclic ring, and 5 to 85 parts by weight of the other alpha,beta-ethylenically unsaturated monomer (E).

14. The dispersion of claim 1 wherein the copolymer has a number average molecular weight of about 700 to about 150,000.

15. The dispersion of claim 1 wherein the copolymer has an amino group equivalent of at least 0.02 milliequivalent/g of copolymer.

16. The dispersion of claim 1 wherein the amount of the dispersing agent is about 1 to about 500 parts by weight per 100 parts by weight of the pigment.

17. A water-base paint containing the dispersion of claim 1.

18. A cationic aqueous pigment dispersion comprising a pigment, a dispersing agent and an aqueous medium, in which the dispersing agent is a water-solubilized or water-dispersed product of a copolymer obtained by copolymerization of (A) 3 to 90 parts by weight of a vinylic unsaturated monomer having a fatty acid residue with at least 8 carbon atoms at the molecular terminal and being obtained by reaction of an ethylenically unsaturated monomer substituted by a hydroxyl group, a carboxyl group, a glycidyl group, an isocyanate group or an aziridinyl group with a fatty acid, (B) 2 to 90 parts by weight of a nitrogen-containing macromonomer having at least one radical-polymerizable functional group at one end thereof, selected from acryloyloxy, methacryloyloxy, allyloxy and aromatic vinyl groups.

(C) 1 to 50 parts by weight of at least one vinylic monomer other than (A) above, selected from aminoalkyl (meth)acrylates, aminoalkyl-(meth)acrylamides, glycidyl methacrylate, allyl glycidyl ether and vinylphenylglycidyl ether, (D) 0 to 91 parts by weight of an unsaturated monomer other than (B) above having a nitrogen-containing heterocyclic ring, and (E) 0 to 91 parts by weight of an alpha,beta-ethylenically unsaturated monomer other than (A), (B), (C) and (D) above.

* * * * *